US008019495B2

(12) United States Patent
Markiton et al.

(10) Patent No.: US 8,019,495 B2
(45) Date of Patent: Sep. 13, 2011

(54) METHOD AND DEVICE FOR ASSISTING THE FLYING OF AN AIRCRAFT DURING AN AUTONOMOUS APPROACH

(75) Inventors: Vincent Markiton, Fontenilles (FR); Edward Strongman, Bretx (FR); François Barre, Plaisance du Touch (FR)

(73) Assignees: Airbus France, Toulouse (FR); Airbus, Blagnac (FR)

( * ) Notice: Subject to any disclaimer, the term of this patent is extended or adjusted under 35 U.S.C. 154(b) by 644 days.

(21) Appl. No.: 12/095,229

(22) PCT Filed: Jan. 10, 2007

(86) PCT No.: PCT/FR2007/000036
§ 371 (c)(1),
(2), (4) Date: May 28, 2008

(87) PCT Pub. No.: WO2007/080313
PCT Pub. Date: Jul. 19, 2007

(65) Prior Publication Data
US 2008/0269966 A1 Oct. 30, 2008

(30) Foreign Application Priority Data
Jan. 11, 2006 (FR) .................................. 06 00245

(51) Int. Cl.
*G08G 5/02* (2006.01)
*G01C 23/00* (2006.01)
*G05D 1/06* (2006.01)

(52) U.S. Cl. ............................. 701/16; 701/18; 340/976
(58) Field of Classification Search .................... None
See application file for complete search history.

(56) References Cited

U.S. PATENT DOCUMENTS

| 4,792,904 | A | 12/1988 | Reinagel |
| 5,593,114 | A | 1/1997 | Ruhl |
| 6,239,745 | B1 * | 5/2001 | Stratton ........................ 342/410 |
| 6,865,477 | B2 * | 3/2005 | Nicosia et al. ................. 701/207 |
| 2003/0225487 | A1 | 12/2003 | Robert |
| 2004/0183698 | A1 * | 9/2004 | Rouquette et al. ............. 340/972 |

FOREIGN PATENT DOCUMENTS
EP 1 335 258 8/2003

OTHER PUBLICATIONS

International Search Report dated Jun. 13, 2007 w/ English translation.
Written Opinion of the International Searching Authority w/ English translation.
B.W. Parkinson et al., "Aircraft Automatic Landing Systems Using GPS," Journal of Navigation UK, vol. 42, No. 1, Jan. 1989, pp. 47-59.

* cited by examiner

*Primary Examiner* — Michael J. Zanelli
(74) *Attorney, Agent, or Firm* — Dickinson Wright PLLC

(57) ABSTRACT

An aircraft guidance system defines a main approach path and a corrected approach path, which has an extra vertical margin related to the ground over which the craft is flying as compared with a main approach path representing a category-1 precision approach. The guidance system guides the aircraft following the corrected approach path.

14 Claims, 3 Drawing Sheets

METHOD AND DEVICE FOR ASSISTING THE FLYING OF AN AIRCRAFT DURING AN AUTONOMOUS APPROACH

FIELD OF THE INVENTION

Background of the Related Art

The present invention relates to a method and a device for assisting with flying an aircraft, which are intended to assist with flying the aircraft at least during an autonomous landing approach to a runway with a view to landing, particularly in the field of military aircraft.

In the context of the present invention, it is considered that an autonomous landing approach needs to allow the aircraft to be flown, without the use of ground-based navigation means, and in instrument meteorological conditions (or IMC) as far as a decision height, for example of 200 feet (approximately 60 meters) which corresponds to the usual decision height for a category 1 precision instrument landing approach using an instrument landing system (known by its English-language abbreviation of ILS). During an autonomous landing approach such as this, the positioning means used by the aircraft are therefore solely on-board means, particularly a satellite-based positioning system, for example of the GPS (Global Positioning System) type, an inertial unit, and barometric sensors. The approach may also be made without an air traffic controller. At said decision height, the crew of the aircraft has to get a visual fix on the runway. If they can, landing is completed as a visual landing with manual guidance. By contrast, if, at this decision height, the crew is unable to see the runway, they have to reaccelerate and go around in order to allow the aircraft to climb back up to a predetermined safe altitude. The approach path used to make such an autonomous landing approach is created before the flight and described on a paper map available to the crew during the flight. This path will have been determined by analyzing the lie of the land around the runway and by defining margins for clearing obstacles. This approach path is also saved in a database of the aircraft flight control system.

As already indicated, the decision height for an autonomous landing approach as considered in the present invention is the same as that of a category 1 precision approach as used in the field of civilian aviation. To implement a precision approach such as this using an ILS, use is customarily made of ground-based stations situated along the edges of the runway and at least one specialist radio receiver mounted on board the aircraft which provides horizontal and vertical guidance before and during the landing by presenting the pilot with the lateral offset from a line of approach and the vertical offset from a descent path. A precision instrument landing approach such as this provides a great deal of very effective assistance to landing, particularly in poor visibility (fog, etc.) or zero visibility. A precision instrument landing approach such as this therefore uses information received from outside. This is not done in the autonomous landing approach considered in the present invention in which the assistance with guidance is provided solely using on-board means, as indicated hereinabove.

Hence, a line of approach which is formed with a view to a precision instrument landing approach cannot be used in an autonomous landing approach especially given that the aircraft performance required to implement a precision instrument landing approach such as this cannot be achieved in the case of an autonomous landing approach.

It is known that aircraft performance can be broken down chiefly into a location component and a guidance component. The guidance component makes it possible to assess the ability of the aircraft to follow the line of approach in question with a certain precision. As for the location component, this is used to guarantee the actual position of the aircraft. Performance under these aspects is considered both in the vertical plane and in the horizontal plane.

Now, in the case of an autonomous landing approach, for which the aircraft is located solely on the basis of information available on board the aircraft, the required performance cannot be achieved in the vertical plane because of the substantial margin of error regarding the aforementioned location component.

As a result, in the context of an autonomous landing approach in the field of military aviation, as considered in the present invention, it is not possible to implement, unmodified, a precision instrument landing approach as used in the field of civil aviation.

SUMMARY OF THE INVENTION

It is an object of the present invention to overcome the aforementioned disadvantages. The invention relates to a method for assisting with flying an aircraft, which is intended to assist with flying the aircraft at least during an autonomous landing approach to a runway with a view to landing.

To this end, according to the invention, said method in which:

a) a line of approach is determined; and
b) the aircraft is guided along said line of approach at least as far as a decision height using only means on board the aircraft, is notable in that:

in step a):
  a1) a main line of approach which is representative of a category 1 precision approach is determined; and
  a2) a vertical correction is determined and, from this vertical correction and from said main line of approach, a corrected line of approach is determined which vertically exhibits a greater margin relative to the terrain being overflown than said main line of approach; and
in step b), said aircraft is guided along said corrected line of approach.

Thus, by virtue of the invention, the aircraft is made to follow a corrected line of approach which has a vertical margin relative to the terrain being overflown, by comparison with a line of approach determined in the usual way for a category 1 precision approach. As a result, this vertical margin allows the aircraft to be flown safely relative to the ground during the autonomous landing approach for which (as already mentioned) the current aircraft performance is inferior to the performance available for a customary category 1 precision instrument landing approach.

It will be noted that, by virtue of the invention, the information, determined in the usual way for a category 1 precision approach, can be used. This in particular makes it easier to implement the invention. A category 1 precision instrument landing approach is described, for example, in Annex 10 of the ICAO (International Civil Aviation Organization), known in French as the OACI (Organisation de l'Aviation Civile Internationale).

In one particular embodiment, the gradient of said corrected line of approach is compared against an auxiliary gradient representing the maximum gradient that the aircraft can fly; and if the gradient of said corrected line of approach is steeper than said auxiliary gradient, a message is emitted informing the pilot of the aircraft that the performance of said aircraft will not allow it to fly along said corrected line of approach.

Furthermore, advantageously, the pilot of the aircraft is presented, on at least one display screen, with first and second indicating means showing said main line of approach and said corrected line of approach, respectively.

In the context of the present invention, said vertical correction used to determine the corrected line of approach can be made in various ways. In a preferred embodiment, in step a2) said vertical correction and said corrected line of approach are determined taking current aircraft performance into consideration.

Thus, the corrected line of approach is tailored to the actual current situation in which the aircraft finds itself. It will be noted that, in order to do this, the aircraft performance is generally known, automatically, by the customary systems fitted on board this aircraft.

In this preferred embodiment, in a first variant, said corrected line of approach is determined using a gradient correction, the gradient P2 of said corrected line of approach satisfying the following relationship:

$$P2 = \arctan\left[(H \cdot \tan P0)/(H \cdot (\tan P0/\tan P1) - \Delta H)\right]$$

in which:
tan denotes the tangent;
arctan denotes the inverse of the tangent;
P0 denotes a gradient that defines a safety cone relative to a category 1 precision approach;
P1 denotes the gradient of said main line of approach;
H denotes said decision height; and
ΔH denotes a vertical margin dependent on current aircraft performance.

Furthermore, in a second variant, said corrected line of approach is determined as being a line:
which is parallel to said main line of approach;
which is translated horizontally downstream in the direction in which the aircraft is flying; and
the horizontal translation ΔL of which satisfies the following relationship:

$$\Delta L = \Delta H / \tan P0$$

in which:
tan denotes the tangent;
ΔH denotes a vertical margin dependent on current aircraft performance; and
P0 denotes a gradient that defines a safety code relative to a category 1 precision approach.

Furthermore, in the context of the present invention, it is also possible to determine said corrected line of approach in said step a2:
using a first gradient correction, the gradient of said corrected line of approach corresponding to the gradient of said main line of approach increased by a predetermined gradient magnitude;
using a gradient correction, the gradient of said corrected line of approach corresponding to the gradient of said main line of approach multiplied by a predetermined value;
using a height correction of constant magnitude.

The present invention also relates to a device for assisting with flying an aircraft, particularly a military transport airplane, which is intended to assist with flying the aircraft at least during an autonomous landing approach of the aforementioned type.

To do this, according to the invention, said device of the type comprising:

a flight control system for determining a line of approach; and
a guidance system for assisting with guiding the aircraft along said line of approach at least as far as a decision height, assisted solely by information available on board the aircraft, is notable in that said flight control system comprises:
a first means for determining a main line of approach which is representative of a category 1 precision approach; and
a second means for determining, on the one hand, a vertical correction and, on the other hand, from this vertical correction and from said main line of approach, a corrected line of approach which vertically exhibits a greater margin relative to the terrain being overflown than said main line of approach, said corrected line of approach being transmitted to said guidance system so that it can assist with guiding the aircraft along this corrected line of approach.

In one particular embodiment, said device additionally comprises a monitoring means for:
comparing the gradient of said corrected line of approach against an auxiliary gradient representing the maximum gradient that the aircraft can fly; and
if the gradient of said corrected line of approach is steeper than said auxiliary gradient, emitting a message informing the pilot of the aircraft that the performance of said aircraft will not allow it to fly along said corrected line of approach.

Furthermore, advantageously, the device according to the invention may additionally comprise:
display means for presenting a pilot of the aircraft, on at least one display screen, with first and second indicating means showing said main line of approach and said corrected line of approach, respectively; and/or
interface means allowing the pilot to input at least one decision height value, for example into the flight control system.

The figures of the attached drawing will make it easy to understand how the invention may be embodied. In these figures, identical references denote elements which are similar.

Figure 1:
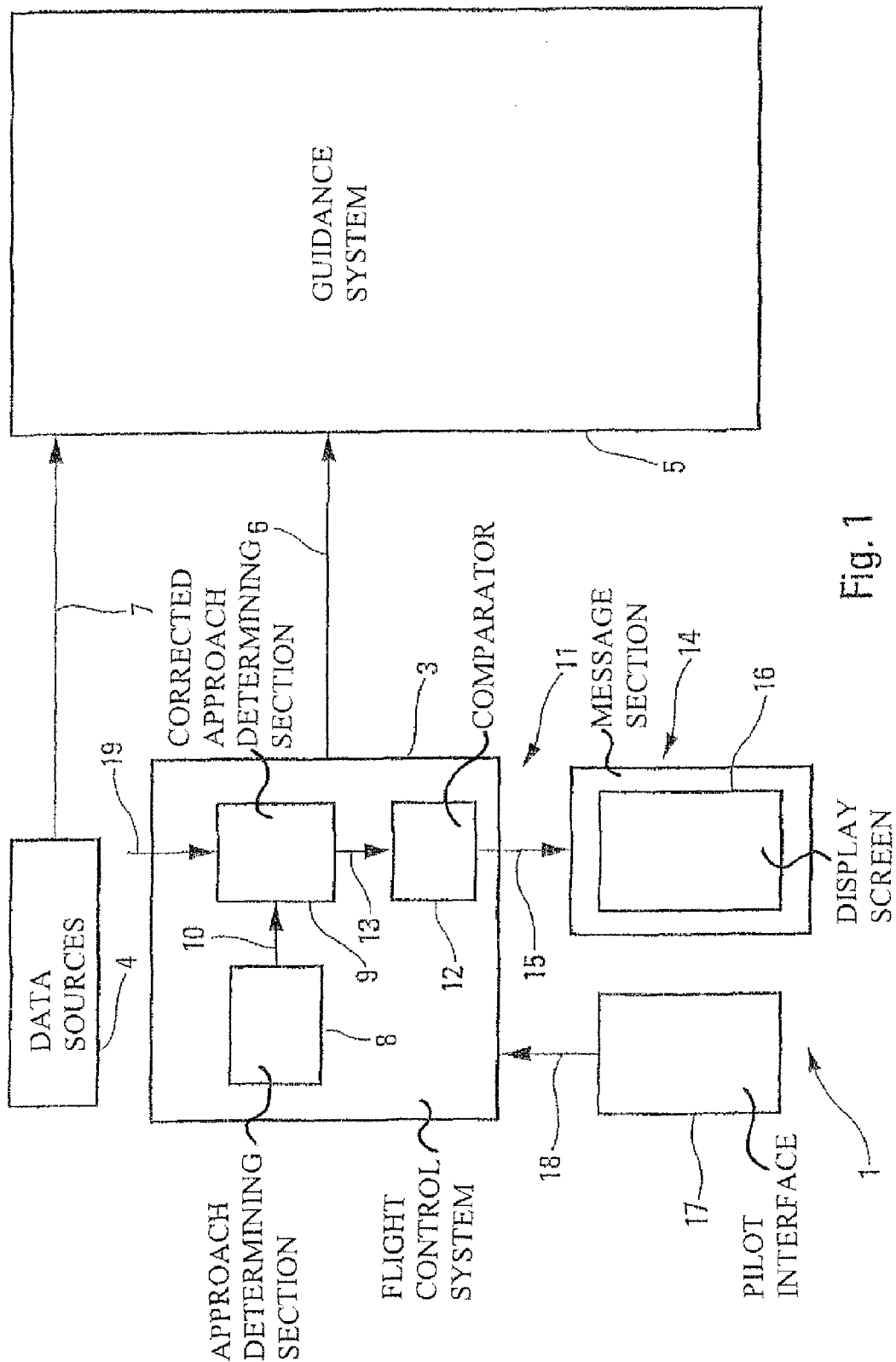
FIG. 1 is the block diagram of a flight assistance device according to the invention.

The device 1 according to the invention and depicted schematically in FIG. 1 is intended to assist with flying an aircraft, particularly a military transport airplane, at least during an autonomous landing approach to a runway 2 with a view to landing.

DETAILED DESCRIPTION OF THE INVENTION

To do this, said device 1 comprises:
a flight control system 3, for example of the FMS (Flight Management System) type, which is able to determine a line of approach;
a collection 4 of customary data sources including, in particular, location means; and
a guidance system 5 which is connected by links 6 and 7 respectively to said flight control system 3 and to said collection 4 and which is intended to assist with guiding the aircraft along the line of approach determined by said flight control system 3, autonomously, that is to say solely using information available on board the aircraft (and originating at least in part from said collection 4) and of doing so as far as a decision height H specified hereinbelow.

In a preferred embodiment, said guidance means 5 comprise the following means which are not specifically depicted:
- a calculation means intended in the customary way to determine flight control data from information received from said flight control system 3 via the link 6 and from said collection 4 via the link 7;
- at least one flying aid means, for example an automatic pilot device and/or a flight director, which, on the basis of the flight control data received from said calculation means determines commands for flying the aircraft; and
- means for actuating controlled components, such as, for example, control surfaces (rudder, ailerons, etc.) of the aircraft to which the flight commands thus determined are applied.

According to the invention, said flight control system 3 comprises:
- a means 8 which comprises, for example, a database, not depicted, and which is able, in the usual way, to determine a main line of approach A1. According to the invention, this main line of approach A1 is representative of a category 1 precision instrument landing approach. It will be noted that a category 1 precision instrument landing approach such as this is described, for example, in Annex 10 of the ICAO (International Civil Aviation Organization), known in French as the OACI (Organisation de l'Aviation Civile Internationale); and
- a means 9 which is connected via a link 10 to said means 8 and which is formed in such a way as to determine:
  - on the one hand, a vertical correction; and
  - on the other hand, from this vertical correction and from said main line of approach A1 received from said means 8, a corrected line of approach A2 which vertically exhibits a greater margin ΔH relative to the terrain being overflown than said main line of approach A1 (at said decision height H).

In addition, according to the invention, said corrected line of approach A2 which is determined by said means 9 is transmitted, via the link 6, to the guidance system 5 so that said guidance system 5 can assist with guiding the aircraft along this corrected line of approach A2. To do this, the aircraft may be guided either automatically, for example using an automatic pilot device, or manually by the aircraft pilot, for example with the assistance of a flight director.

Thus, the device 1 according to the invention causes the aircraft, as it approaches the runway 2, to follow a corrected line of approach A2 which, at the decision height H, displays a vertical margin ΔH relative to the terrain being overflown, by comparison with a line of approach A1 determined in the usual way for a category 1 precision approach. As a result, this vertical margin ΔH allows the aircraft to fly safely relative to the ground during the autonomous approach implemented by the device 1, for which current aircraft performance is inferior to the performance available for a customary category 1 precision instrument landing approach.

Furthermore, because the means 8 uses information determined in the usual way for a category 1 precision approach, the invention is easier to implement.

In one particular embodiment, the device 1 comprises, in addition, a monitoring means 11 which is, for example, at least partially incorporated into said flight control system 3 and which comprises:
- a means 12 which is connected via a link 13 to said means 9 and which is formed in such a way as to compare the gradient P2 of said corrected line of approach A2 determined by said means 9 against an auxiliary gradient which represents the maximum gradient that the aircraft can fly, according to its certification certificate; and
- a means 14 (for example display means) which is connected via a link 15 to said means 12 and which is formed in such a way as to emit a message (audible and/or visual) informing the pilot of the aircraft that said aircraft performance will not allow the aircraft to fly along said corrected line of approach A2, when the gradient P2 of the latter becomes steeper than said auxiliary gradient.

The means 14 may present this message, in particular, on a display screen 16 which, for example, forms part of said flight control system 3.

Furthermore, in one particular embodiment, said device 1 also comprises display means, for example said means 14, for presenting a pilot of the aircraft, on at least one display screen in the cockpit, and in particular on the display screen 16, with first and second indicating means (for example plots of the path visible on part of a screen illustrating a vertical plane) showing said main line of approach A1 and said corrected line of approach A2, respectively.

In the context of the present invention, said means 9 may employ different manners of determining said vertical correction used to determine the corrected line of approach A2.

In one preferred embodiment, said means 9 determines said vertical correction and said corrected line of approach A2 taking current aircraft performance into consideration. Thus, the device 1 according to the invention adapts the corrected line of approach A2 to suit the actual situation in which the aircraft currently finds itself. To do this, the aircraft performance parameters used are received automatically by the means 9 (via a link 19 depicted generally) of customary systems (not depicted) found on board said aircraft.

Figure 2:
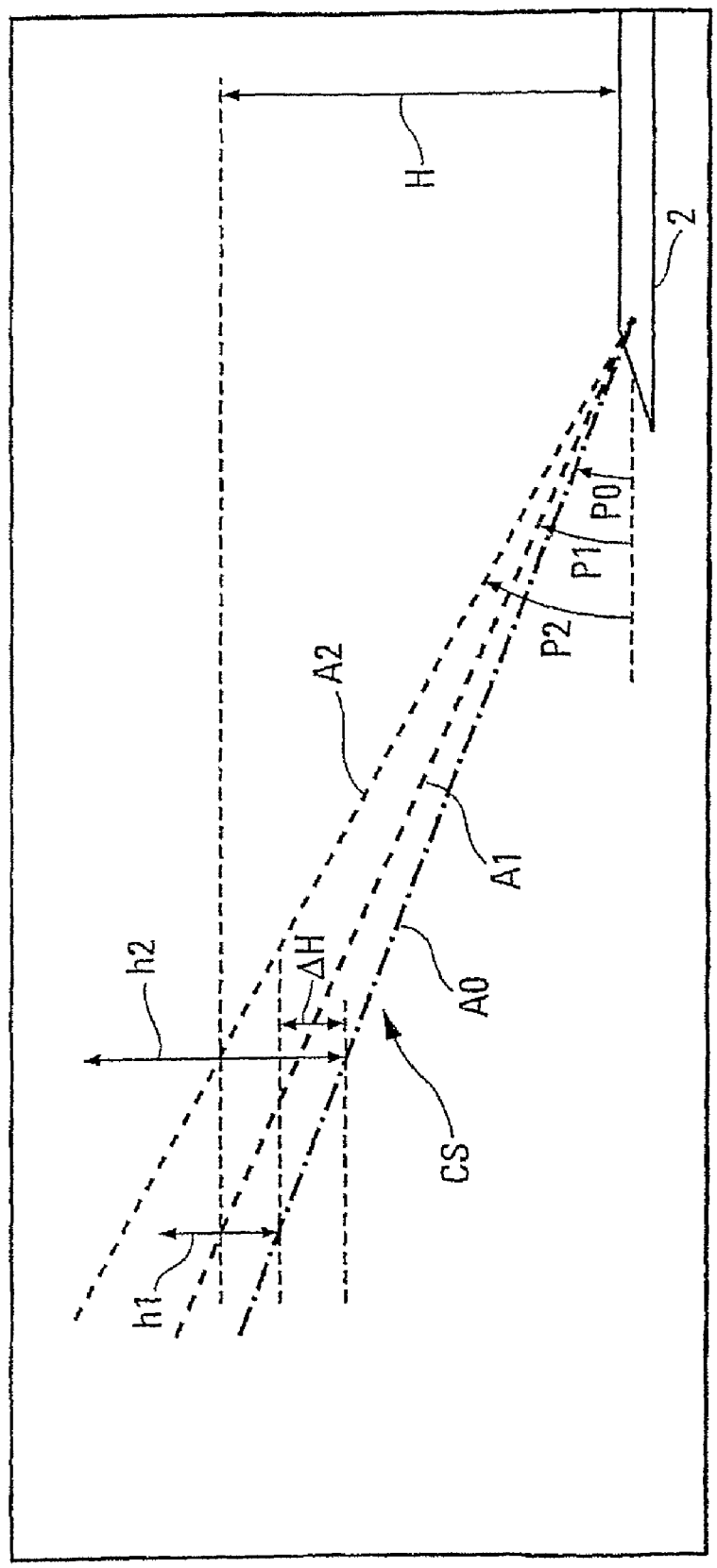
FIGS. 2 and 3 are graphs demonstrating the advantages of the present invention in two different embodiments, respectively.

In this preferred embodiment, in a first variant depicted in FIG. 2, said means 9 determines said corrected line of approach A2 using the gradient correction. The gradient P2 of said corrected line of approach A2 satisfies the following relationship:

$$P2 = \arctan\left[(H \cdot \tan P0)/(H \cdot (\tan P0/\tan P1) - \Delta H)\right]$$

in which:
- tan denotes the tangent;
- arctan denotes the inverse of the tangent;
- P0 denotes a gradient (for example 2°) defining a safety cone CS which relates to a category 1 precision instrument landing approach and which is illustrated in FIG. 2 by a line A0 showing its lower end;
- P1 denotes the gradient (for example 3°) of said main line of approach A1;
- H denotes said decision height, for example 200 feet (about 60 meters) that can be input into the flight control system 3 by a pilot of the aircraft, particularly using a customary interface means 17 which is connected via a link 18 to said flight control system 3; and
- ΔH denotes said vertical margin which is dependent on the current aircraft performance.

As can be seen in FIG. 2, at the decision height H, the safety cone CS has:
- a small height h1, by comparison with the main line of approach A1; and
- a height h2 greater than the height h1 (by an amount 2ΔH) with respect to the corrected line of approach A2.

As a result, because the aircraft performance during the autonomous approach considered in the present invention is not capable of ensuring that the aircraft will remain inside the safety cone CS if it follows the main line of approach A1 (which relates to a precision approach), the device 1 according to the invention makes a height correction adding a margin ΔH with respect to the terrain being overflown. This indirectly enlarges the safety cone to a height h2, when the aircraft is guided along said corrected line of approach A2, by comparison with the safety cone CS defined by the main line of approach A1.

Figure 3:
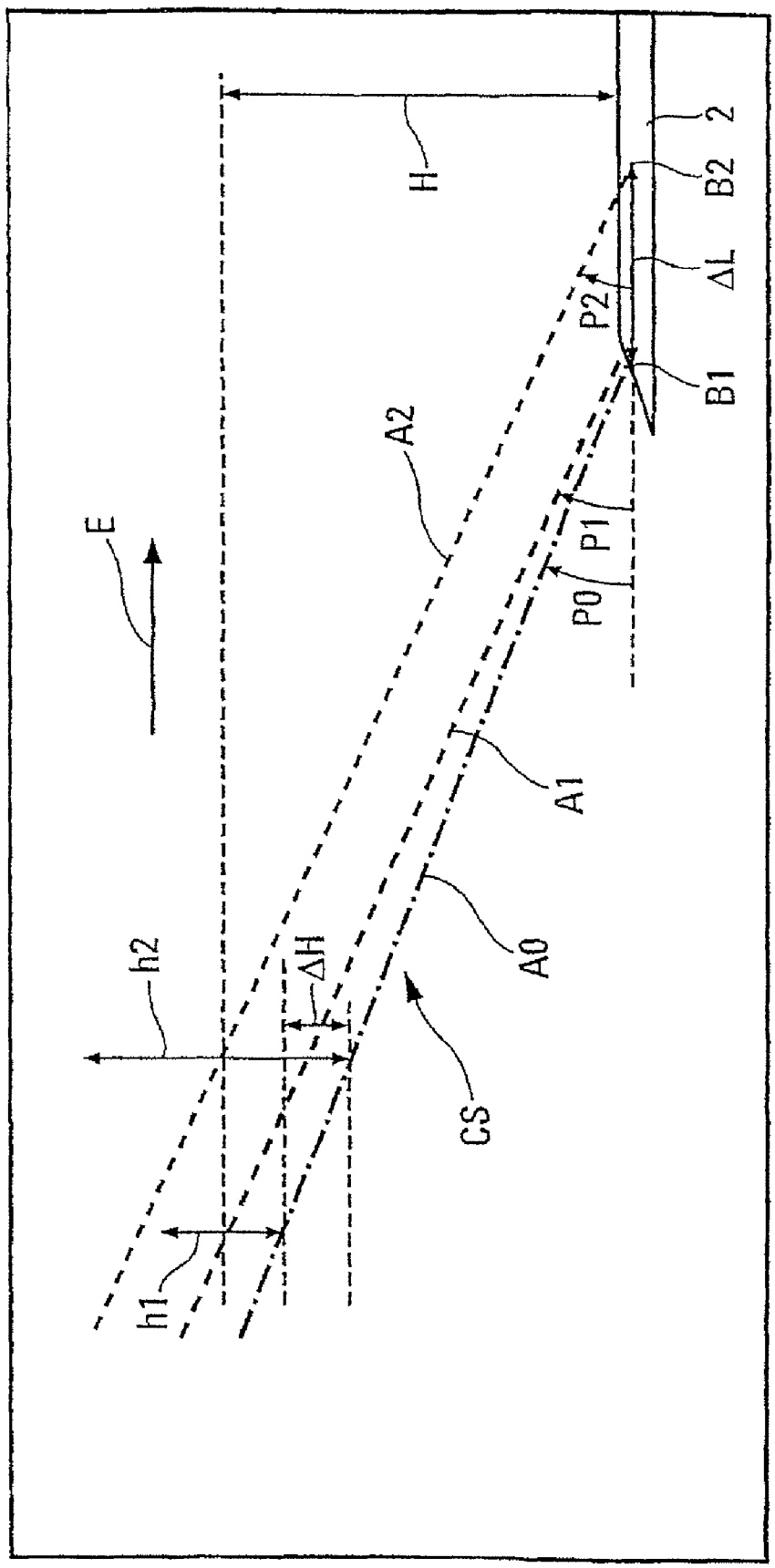

Furthermore, in a second variant of said aforementioned preferred embodiment, as depicted in FIG. 3, said means 9 determines said corrected line of approach as being a line A2:
which is parallel to said main line of approach A1;
which is horizontally translated downstream in the direction E in which the aircraft is flying; and
the horizontal translation ΔL of which satisfies the following relationship:

$$\Delta L = \Delta H / \tan P0$$

The ground-contact point of the line of approach is thus translated by a distance ΔL from a point B1 for the main line of approach A1 to a point B2 for the corrected line of approach A2.

It will be noted that this translational displacement of the ground-contact point leads to an increase in the landing distance, because the point of impact on the runway 2 is moved out. Hence, at the decision height H, the pilot is advised to increase his approach gradient by aiming for the threshold of the runway so as to limit the landing distance. The device 1 may also include an alert means (not depicted) to alert the crew if the landing distance will prove too long by comparison with the length of the runway 2.

There are also other possible ways of allowing the means 9 to determine the corrected line of approach A2.

In a first alternative embodiment, said means 9 determines said corrected line of approach A2 using a first gradient correction. In this case, the gradient of said corrected line of approach A2 corresponds to the gradient of said main line of approach A1, increased by a predetermined gradient magnitude, for example 0.3°.

Furthermore, in a second alternative embodiment, said means 9 determines said corrected line of approach A2 using a second gradient correction. In this case, the gradient of said corrected line of approach A2 corresponds to the gradient of said main line of approach A1, multiplied by a predetermined value, for example 0.1.

In both of these two alternative embodiments, the correction is not dependent on the decision height H or on the actual aircraft performance.

Furthermore, in a third alternative embodiment, said means 9 determines the corrected line of approach A2 using a height correction of constant magnitude. In this case too, the correction is independent of the actual aircraft performance. As a preference, this correction takes account of conservative assumptions, setting the margin needed for nominal aircraft performance.

As a result, in the context of the present invention, the autonomous approach path taken into consideration will be a corrected approach path or line of approach A2 which is defined on the basis of a main line of approach A1 representative of a customary category 1 precision instrument landing approach. The information relating to this main line of approach A1 is generally saved in a database belonging to the means 8. It is generally also indicated on a paper approach map supplied to the crew. During flight, the crew, for example using the interface means 17 of the flight control system 3, incorporates an autonomous approach into its flight plan. The information relating to the main line of approach A1 is then extracted from the database. The crew also informs the flight control system 3 of the decision height H for the approach using said interface means 17. This decision height H is defined on the approach map. At a predetermined distance from the destination airfield, for example at 100 NM (about 180 kilometers) away, the means 9 belonging to the flight control system 3 calculates the vertical correction, preferably as a function of the decision height H supplied by the crew and of the actual aircraft performance received via the link 19 from aircraft systems which have not been depicted and, in particular, from a location system. Said means 9 then determines the corrected line of approach A2 that the aircraft must follow, with the aid of the guidance system 5.

The invention claimed is:

1. A method for assisting with flying an aircraft, the method comprising:
a) determining a line of approach; and
b) guiding the aircraft along said line of approach at least as far as a decision height using only components on board the aircraft,
wherein:
in step a):
a1) a main line of approach which is representative of a category 1 precision approach is determined; and
a2) a vertical correction is determined and, from this vertical correction and from said main line of approach, a corrected line of approach is determined which vertically exhibits a greater margin relative to the terrain being overflown than said main line of approach; and
in step b), said aircraft is guided along said corrected line of approach.

2. The method as claimed in claim 1, wherein, in step a):
the gradient of said corrected line of approach is compared against an auxiliary gradient representing the maximum gradient that the aircraft can fly; and
if the gradient of said corrected line of approach is steeper than said auxiliary gradient, a message is emitted informing a pilot of the aircraft that the performance of said aircraft will not allow it to fly along said corrected line of approach.

3. The method as claimed in claim 1, wherein a pilot of the aircraft is presented, on at least one display screen, with first and second indicators that show said main line of approach and said corrected line of approach, respectively.

4. The method as claimed in claim 1, wherein in step a2) said vertical correction and said corrected line of approach are determined taking current aircraft performance into consideration.

5. The method as claimed in claim 4, wherein in step a2) said corrected line of approach is determined using a gradient correction, the gradient P2 of said corrected line of approach satisfying the following relationship:

$$P2 = \arctan[(H \cdot \tan P0)/(H \cdot (\tan P0/\tan P1) - \Delta H)]$$

in which:
tan denotes the tangent;
arctan denotes the inverse of the tangent;
P0 denotes a gradient that defines a safety cone relative to a category 1 precision approach;
P1 denotes the gradient of said main line of approach;
H denotes said decision height; and
ΔH denotes a vertical margin dependent on the current aircraft performance.

6. The method as claimed in claim 4, wherein in step a2) said corrected line of approach is determined as being a line direction in which the aircraft is flying; and the horizontal translation $\Delta L$ of which satisfies the following relationship:

$$\Delta L = \Delta H / \tan P0$$

in which:

tan denotes the tangent;

$\Delta H$ denotes a vertical margin dependent on the current aircraft performance; and $P0$ denotes a gradient that defines a safety cone relative to a category 1 precision approach.

7. The method as claimed in claim 1, wherein in step a2) said corrected line of approach is determined using a gradient correction, the gradient of said corrected line of approach corresponding to the gradient of said main line of approach increased by a predetermined gradient magnitude.

8. The method as claimed in claim 1, wherein in step a2) said corrected line of approach is determined using a gradient correction, the gradient of said corrected line of approach corresponding to the gradient of said main line of approach multiplied by a predetermined value.

9. The method as claimed in claim 1, wherein in step a2) said corrected line of approach is determined using a height correction of constant magnitude.

10. A device for assisting with flying an aircraft, said device comprising:

a flight control system for determining a line of approach; and a guidance system for assisting with guiding the aircraft along said line of approach at least as far as a decision height, assisted solely by information available on board the aircraft, wherein said flight control system comprises:

a first approach determining section that determines main line of approach which is representative of a category 1 precision approach; and a second approach determining section that determines on the one hand, a vertical correction and, on the other hand, from this vertical correction and from said main line of approach, a corrected line of approach which vertically exhibits a greater margin relative to the terrain being overflown than said main line of approach, said corrected line of approach being transmitted to said guidance system so that it can assist with guiding the aircraft along this corrected line of approach.

11. The device as claimed in claim 10, wherein it additionally comprises:

a monitoring section that compares the gradient of said corrected line of approach against an auxiliary gradient representing the maximum gradient that the aircraft can fly, wherein if the gradient of said corrected line of approach is steeper than said auxiliary gradient, a message is emitted informing a pilot of the aircraft that the performance of said aircraft will not allow it to fly along said corrected line of approach.

12. The device as claimed in claim 10, wherein it additionally comprises a display that presents a pilot of the aircraft, on at least one display screen, with first and second indicators that show said main line of approach and said corrected line of approach, respectively.

13. The device as claimed in claim 10, wherein it additionally comprises an interface that allows a pilot to input at least one decision height value.

14. An aircraft comprising the device specified in claim 10.

* * * * *